(12) United States Patent
Sabino

(10) Patent No.: US 11,785,440 B2
(45) Date of Patent: Oct. 10, 2023

(54) PUBLIC SAFETY SYSTEM AND METHOD

(71) Applicant: GS3 Innovation LLC, Columbus, OH (US)

(72) Inventor: Georgio Sabino, Cleveland, OH (US)

(73) Assignee: GS3 INNOVATION LLC, Columbus, OH (US)

( * ) Notice: Subject to any disclaimer, the term of this patent is extended or adjusted under 35 U.S.C. 154(b) by 0 days.

(21) Appl. No.: 17/587,001

(22) Filed: Jan. 28, 2022

(65) Prior Publication Data

US 2022/0240072 A1 Jul. 28, 2022

Related U.S. Application Data

(60) Provisional application No. 63/142,746, filed on Jan. 28, 2021.

(51) Int. Cl.
| | |
|---|---|
| *H04W 4/90* | (2018.01) |
| *H04M 1/72469* | (2021.01) |
| *H04M 1/72418* | (2021.01) |
| *H04W 4/14* | (2009.01) |
| *H04W 4/38* | (2018.01) |
| *G06F 16/9035* | (2019.01) |
| *H04M 1/72484* | (2021.01) |

(52) U.S. Cl.
CPC .......... *H04W 4/90* (2018.02); *G06F 16/9035* (2019.01); *H04M 1/72418* (2021.01); *H04M 1/72469* (2021.01); *H04M 1/72484* (2021.01); *H04W 4/14* (2013.01); *H04W 4/38* (2018.02)

(58) Field of Classification Search
CPC . H04W 4/90; H04W 4/38; H04W 4/14; G06F 16/9035; G06F 16/909; H04M 1/72418; H04M 1/2469; H04M 1/72484
See application file for complete search history.

(56) References Cited

U.S. PATENT DOCUMENTS

| | | | | |
|---|---|---|---|---|
| 2006/0106780 A1* | 5/2006 | Dagan | ..................... | G06Q 30/02 |
| 2009/0217178 A1* | 8/2009 | Niyogi | ............... | G06Q 30/0255 |
| | | | | 707/999.1 |
| 2013/0031173 A1* | 1/2013 | Deng | ................. | G06Q 30/0255 |
| | | | | 709/204 |
| 2015/0281658 A1* | 10/2015 | Lee | ......................... | H04N 7/188 |
| | | | | 348/211.1 |
| 2019/0222994 A1* | 7/2019 | Florey | ................... | H04L 65/403 |

FOREIGN PATENT DOCUMENTS

| | | | | | |
|---|---|---|---|---|---|
| JP | | 7037899 B2 | * | 3/2022 | ............. G01C 19/28 |
| WO | WO-2013122809 | A1 | * | 8/2013 | ........... G08B 25/016 |
| WO | WO-2020140210 | A1 | * | 7/2020 | ........... F16M 11/041 |

* cited by examiner

*Primary Examiner* — Farid Seyedvosoghi
(74) *Attorney, Agent, or Firm* — Dinsmore & Shohl LLP

(57) ABSTRACT

A feedback based public safety method is provided. The method is implemented by a computing device and comprising receiving, from an external device of an individual, identification data of the individual associated with the external device, accessing from one or more databases, by the computing device of the user, ratings data specific to the individual, the ratings data is based on historical interactions of the individual, comparing the ratings data with one or more of a plurality of threshold values, determining, based on the comparing, whether the ratings data satisfies one or more of the plurality of threshold values, and initiating one or more of a plurality of action sets responsive to the ratings data satisfying the one or more of the plurality of threshold values.

16 Claims, 16 Drawing Sheets

PUBLIC SAFETY SYSTEM AND METHOD

CROSS REFERENCE TO RELATED APPLICATION

This application claims priority to U.S. Application Ser. No. 63/142,746 filed on Jan. 28, 2021, the entire disclosure of which is hereby incorporated by reference.

TECHNICAL FIELD

The present invention relates to systems and methods for a public safety system, and more particularly to a public safety system that assists in interactions between persons and officials.

BACKGROUND

Americans and other citizens of the world are currently living in an era of greater division, polarity, extremism and disparities than ever before. Current events in the news and statistics highlight tension between officials and citizens. This tension can lead to protests after interactions with officials and citizens.

During interactions with officials, many individuals feel threatened or in danger. Officials, on the other hand, must try to assess countless situations and deescalate tension. Unfortunately, there are interactions that do not result in deescalated tension. Such interactions may lead to mental or physical harm, or even death. This harm is all too often, completely avoidable. Further, it is impossible for individuals or officials to know histories associated with each other during an interaction.

In some instances, individuals may contact third parties by traditional means, such as dialing an emergency number on a telephone, use of social media to stream interactions, or the like. Further, individuals may need to perform a number of different tasks on different devices to begin recording interactions, contacting third parties, or otherwise taking steps to mitigate interactions.

In some systems, a user may initiate a phone call by placing a particular finger on a scanner of a smart phone. This may trigger automatic dialing to a predetermined number. This requires the individual to interact with the person who they are calling, which may be prohibited by officials.

In addition, there are a variety of potential situations where a threat to the safety of a driver or passenger of a vehicle occurs. Known solutions discussed above may be utilized in a vehicle scenario, but have the same limitations listed above.

Therefore, there is a need for improved public safety systems and methods that, for example, allow individuals and officials to interact, view information, or otherwise deescalate interactions before meeting face-to-face. Further, there is a need for improved public safety systems and methods that may allow for feedback on interactions, third party monitoring, or automated monitoring of interactions.

SUMMARY

In one embodiment, a feedback based public safety method is provided. The method is implemented by a computing device and comprising receiving, from an external device of an individual, identification data of the individual associated with the external device, accessing from one or more databases, by the computing device of the user, ratings data specific to the individual, the ratings data is based on historical interactions of the individual, comparing the ratings data with one or more of a plurality of threshold values, determining, based on the comparing, whether the ratings data satisfies one or more of the plurality of threshold values, and initiating one or more of a plurality of action sets responsive to the ratings data satisfying the one or more of the plurality of threshold values.

In another embodiment, a feedback based public safety system is provided. The system comprises one or more processors included as part of a computing device, and non-transitory computer readable medium storing instructions that, when executed by the one or more processors, cause the computing device to receive, from an external device of an individual, identification data of the individual associated with the external device, access, from one or more databases, ratings data specific to the individual, the ratings data is based on historical interactions of the individual, compare the ratings data with one or more of a plurality of threshold values, determine, based on the comparing, whether the ratings data satisfies one or more of the plurality of threshold values, and initiate one or more of a plurality of action sets responsive to the ratings data satisfying the one or more of the plurality of threshold values.

These and additional features provided by the embodiments described herein will be more fully understood in view of the following detailed description, in conjunction with the drawings.

DESCRIPTION OF THE DRAWINGS

The present teachings may be better understood by reference to the following detailed description taken in connection with the following illustrations, wherein.

Figure 1:
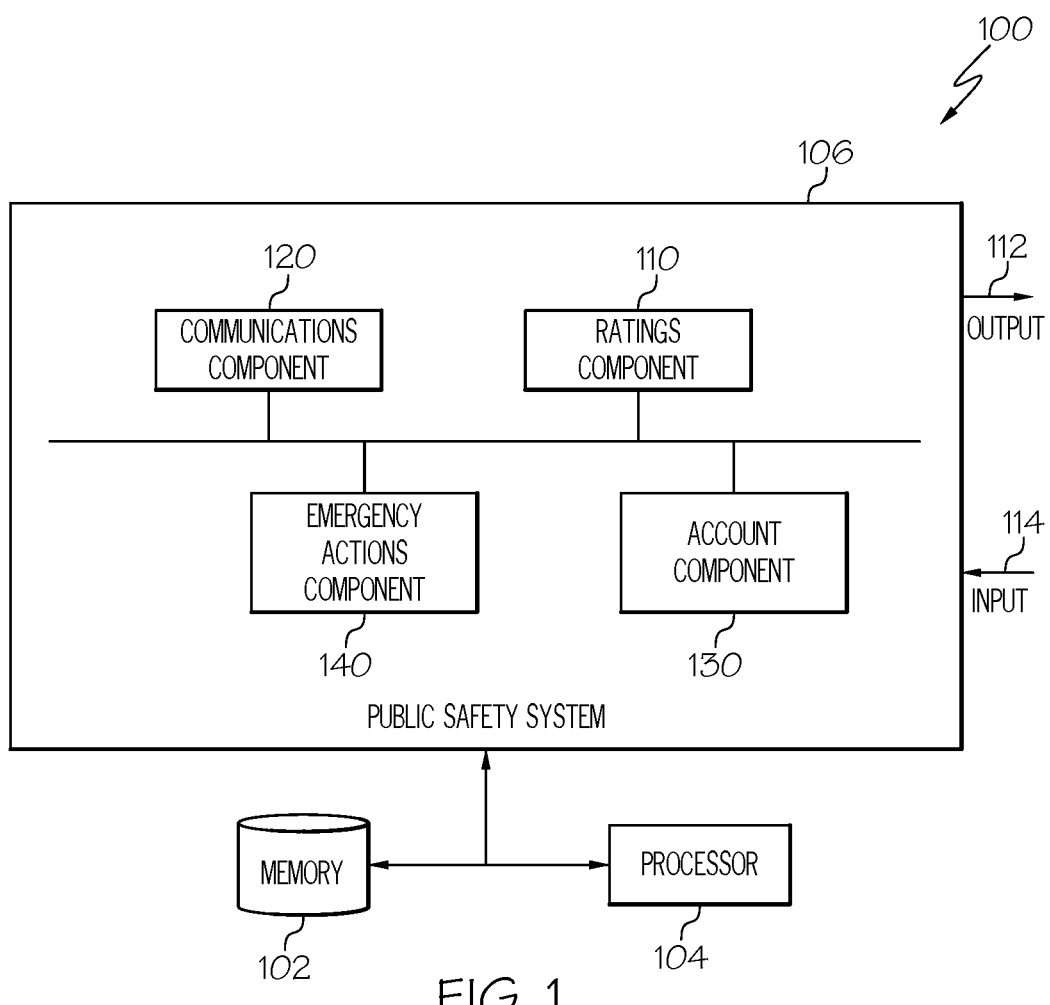
FIG. 1 is a functional block diagram of a public safety system in accordance with the present disclosure.

The invention may be embodied in several forms without departing from its spirit or essential characteristics. The scope of the invention is defined in the appended claims, rather than in the specific description preceding them. All embodiments that fall within the meaning and range of equivalency of the claims are therefore intended to be embraced by the claims.

DETAILED DESCRIPTION

Reference will now be made in detail to embodiments of the present teachings, examples of which are illustrated in the accompanying drawings. It is to be understood that other embodiments may be utilized and structural and functional changes may be made without departing from the scope of the present teachings. Moreover, features of the embodiments may be combined, switched, or altered without departing from the scope of the present teachings, e.g., features of each disclosed embodiment may be combined, switched, or replaced with features of the other disclosed embodiments. As such, the following description is presented by way of illustration and does not limit the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

Moreover, terms such as "access point," "server," and the like, are utilized interchangeably, and refer to a network component or appliance that serves and receives control data, voice, video, sound, or other data-stream or signaling-stream. Data and signaling streams may be packetized or frame-based flows. Furthermore, the terms "user," "citizen," "individual," and the like are employed interchangeably throughout the subject specification, unless context suggests otherwise or warrants a particular distinction among the terms. The term "official" generally refers to a user who is appointed or otherwise provide with authority to serve in a public capacity, such as law enforcement officers, politicians, judges, or the like. It is noted that such terms may refer to human entities or automated components supported through artificial intelligence (e.g., a capacity to make inference).

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device.

A network typically includes a plurality of elements that host logic. In packet-based wide-area networks (WAN), servers (e.g., devices comprising logic) may be placed at different points on the network. Servers may communicate with other devices and/or databases. In another aspect, a server may provide access to a user account. The "user account" includes attributes for a particular user and commonly include an ID associated with the user. The ID may be associated with a particular mobile device and/or vehicle owned by the user. The user account may also include information such as relationships with other users, application usage, location, personal settings, and other information.

Embodiments may utilize substantially any wired or wireless network. For instance, embodiments may utilize various radio access network (RAN), e.g., Wi-Fi, global system for mobile communications, universal mobile telecommunications systems, worldwide interoperability for microwave access, enhanced general packet radio service, third generation partnership project long term evolution (3G LTE), fourth generation long term evolution (4G LTE), third generation partnership project 2, BLUETOOTH®, ultra-mobile broadband, high speed packet access, xth generation long term evolution, or another IEEE 802.XX technology. Furthermore, embodiments may utilize wired communications.

It is noted that, terms "user equipment," "user device," "user equipment device," "client," and the like are utilized interchangeably in the subject application, unless context warrants particular distinction(s) among the terms. Such terms may refer to a network component(s) or appliance(s) that sends or receives data, voice, video, sound, or substantially any data-stream or signaling-stream to or from network components and/or other devices. By way of example, a user equipment device may comprise an electronic device capable of wirelessly sending and receiving data. A user equipment device may have a processor, a memory, a transceiver, an input, and an output. Examples of such devices include cellular telephones (e.g., smart phones), personal digital assistants (PDAs), portable computers, tablet computers (tablets), hand held gaming counsels, wearables (e.g., smart watches), desktop computers, etc. It is noted that the user device my also be referred to as a computing device and may include an image capturing component, e.g., a internal camera that is built as part of the user device.

In an embodiment, a user device may include a software application or "app." The app may communicate with various devices, users, databases or the like. For instance, the app may interact with a user, a vehicle, external camera systems, external sensors, third-parties, other user devices, databases (including third-party databases), and the like.

It is noted that user equipment devices can communicate with each other and with other elements via a network, for instance, a wireless network, or a wireline network. A "network" can include broadband wide-area networks such as cellular networks, local-area networks, wireless local-area networks (e.g., Wi-Fi), and personal area networks, such as near-field communication networks including BLUETOOTH®. Communication across a network may include packet-based communications, radio and frequency/amplitude modulations networks, and the like. Communication may be enabled by hardware elements called "transceivers". Transceivers may be configured for specific networks and a user equipment device may have any number of transceivers configured for various networks. For instance, a smart phone may include a cellular transceiver, a Wi-Fi transceiver, a BLUETOOTH® transceiver, or may be hardwired. In those embodiments in which it is hardwired, any appropriate kind or type of networking cables may be utilized. For example, USB cables, dedicated wires, coaxial cables, optical fiber cables, twisted pair cables, Ethernet, HDMI and the like.

Disclosed embodiments generally relate to public safety systems and methods. For instance, embodiments may include a public safety system comprising at least one memory device and processor. The memory may be configured for storing computer executable applications. The processor may facilitate operation of the computer executable components. It is noted that while embodiments described a user device as comprising an app, the app may be comprised of one or more other devices. For instance, portions of the app may be comprised of the user device, an external camera, a vehicle, in a remote device (e.g., a cloud device), or the like.

In at least one embodiment, the public safety system includes a rating component and communications component. The ratings component may retrieve ratings of officials and may render ratings for a user's review via a user device. In another aspect, the ratings component may allow a user to provide user feedback, such as a rating (e.g., numerical rating, number of stars, thumbs up/down, or the like). For example, when a user is driving a car and gets pulled over by an official, the public safety system may retrieve ratings of the official from a data store. The public safety system may then alert a user to the ratings of the official. The user may then determine an appropriate action to take based on the ratings. For instance, when the ratings indicate a poor or confrontational history, the user may determine to begin recording an interaction, contact legal representatives, request a second official or supervisor review of the interaction, or the like.

In another example, the user may utilize the communications component to interact with the official via a secure video conference between the user device and a user device associated with the official. Such interactions may occur before face-to-face interactions. This may allow the user and the official to establish a relationship and make first contact prior to making physical face-to-face contact. The user may provide information to the official, such as the user's name, passengers, or the like. In another example, the official may provide information to the user, such as reason for being pulled over, name of the official, and procedure for the interaction.

As described herein, embodiments may provide for increased safety for users and officials, increased transparency, increased public confidence in officials, and the like. Moreover, use of the systems and methods described herein may prevent or greatly reduce the bodily harm and mental harm endured by users through interactions with officials. Likewise, governing organizations (e.g., municipalities, state governments, federal governments, etc.) may be able to monitor officials, assist in interactions, or otherwise provide for safer and less confrontational interactions.

Referring now to FIG. 1, there depicted is a block diagram of a functional system 100 that may provide a user with safety tools for interactions with officials. System 100 may primarily include public safety system 106, memory 102, and processor 104. Memory 102 may be configured for storing computer executable components such as a ratings component 110, a communications component 120, account component 130, and an emergency actions component 140. Processor 104 may facilitate operation of the computer executable components. It is noted that system 100 may include one or more devices, such as a user device, a vehicle, and an external camera. It is further noted that one or more devices may comprise, at least in part, the various components. For instance, a single component of system 100 may be comprised by one or more devices. While shown as separate or distinct components at least for simplicity of explanation, the components of system 100 may be comprised by one or more components. Moreover, one or more of the components may form an application or app. Further, the system 100 may include a plurality of user devices that may be linked together through a network. These user devices may be operatively linked with a server.

The ratings component 110 may allow a user to provide feedback as input 114 following an interaction with an official. This rating may be a numerical value, scaled rating (e.g., number of stars out of possible stars), thumbs up/down, textual review, or the like. It is further noted that the rating may be divided into particular categories, such as professionalism, attitude, aggressiveness, overall score, or the like. The rating may be stored in a memory 102. In an aspect, the public safety system may aggregate the rating with other ratings, such as historical ratings. It is noted that the rating may be aggregated across a global user base, a subset of users, or the like.

It is further noted that the rating component 110 may receive input 114 from other systems. The input 114 may include information not manually entered by a user. For instance, the input 114 may include information from one or more of a biometric monitor (e.g., heart rate monitor, breathing monitor, blood pressure monitor, etc.), an audio device, a camera, or the like. In at least one embodiment, the rating component 110 may include logic to identify terms, patterns, a tone of voice, or other information from captured audio. Additionally or alternatively, biometric monitors may provide biometric information associated with the user, the official, by-standers or the like. The ratings component 110 may determine stress levels, anxiety levels, or other indicators based on the biometric information. Moreover, cameras may capture images and ratings component 110 may utilize pattern recognition, motion recognition, gesture recognition, or the like to identify certain images, actions, facial expressions or the like associated with the user, the official, by-standers or the like.

The public safety system 106 may utilize the input 114 from such other systems and may be utilized with or without a user's input rating. For example, the ratings component 110 may determine a rating based on biometric information, audio information, image information, or the like. If, for instance, the biometric information indicates a high level of stress, anxiety, or tension during an interaction, ratings component 110 may determine to assign a rating indicative of the high level. On the other hand, if the biometric information indicates a low level of stress, anxiety, or tension during an interaction, ratings component 110 may determine to assign a rating indicative of the low level. It is noted that the biometric information may be weighted based on a user's history, history of other user's or the like. Moreover, one or more baseline markers may be utilized to rate a level of stress. For example, biometric information may be gathered during periods of inactivity or relaxing activity, periods of intentional physical activity (e.g., exercise), or the like. Such baselines may be utilized to normalize measured biometric information during an interaction. It is further noted that the biometric information may come from the user, the official, bystanders, or others. In at least some examples, the biometric information may be utilized with a user's input (e.g., numerical rating, etc.) to generate a weighted rating for the official or interaction.

As another example, the ratings component 110 may utilize captured audio to generate or calculate a rating. For instance, the ratings component 110 may identify potential triggering words or phrases that may be linked to increased tension or decreased safety. Such terms and phrases may be identified based on comparison with a library of stored terms or phrases, analysis of terms of phrases utilized in past encounters, or the like. For instance, a certain term may be substantially more prevalent during negatively rated interactions. As such, the term may be identified and factored into a rating. Other terms may be provided by an administrator, governing body, public safety or social justice institutions, or the like. Moreover, the ratings component 110 may determine tones, volumes, or other vocal markers that may affect an interaction.

In at least some examples, the ratings component 110 may utilize captured imagery (e.g., video, still images, gestures, etc.) to generate or calculate a rating. For instance, the ratings component 110 may identify facial expressions, physical actions, or gestures associated with one or more of the user, the official, bystanders, or others. Certain facial expressions, physical actions, or gestures may be associated with different ratings based on, for example, historical interactions, stored libraries of images or patterns, or the like.

Similar to the above, audio or video information may be normalized through audio or video gathered during a training period, periods of calm, periods of stress, or the like. It is further noted that the audio information may come from the user, the official, bystanders, or others. As described herein, the analyzed audio or video may be utilized with or without a user's input (e.g., numerical rating, etc.) or other captured information (e.g., biometric information, image information, etc.) to generate a weighted rating for the official or interaction.

Moreover, other factors may be utilized to generate weighted rankings, such as geographic location, time of day, time of year, weather, lighting, current events, or the like. Such information may be provided by a user, an official, automatically obtained by the system 100, provided by third parties, of the like. In at least some embodiments, user's may opt in to provide demographic information, health history (e.g., medical conditions), or the like.

In embodiments, Account component 130 may provide access to stored user preferences based on received data, historical data, and the like. In at least one embodiment, user preferences may be stored in a user account (e.g., via memory 102). The account component 130 may provide for login procedures where a user may enter login credentials. It is noted that the account component 130 may include or link to a user's accounts on third party websites or services. For instance, the account component 130 may allow for connection to a user's third-party accounts, such as social media accounts, email accounts, or the like. Further, the account component 130 may allow a user to opt-out of some or all aspects of the system 100, such as providing demographics.

In another example, a rating determined after an interaction may be utilized to update or otherwise determine an official's global or historical rating. For instance, the ratings component 110 may store historical ratings associated with officials. The historical rating may be displayed to the user before, during, or after an interaction. It is further noted that the historical rating may be viewable to the official, the public in general, government bodies, social justice institutions, or the like.

It is noted that the historical rating may be based on past user ratings of the official that may be weighted according to various weighting techniques (e.g., simple average, weighted averages, etc.) According to some embodiments, ratings component 110 may communicate with or otherwise access information from public data stores, third-parties, or the like to generate the historical ratings. For instance, ratings component 110 may receive access to municipality records, court documents, or the like. The records may indicate the presence or absence of disciplinary events, complaints, awards, or other information associated with an official. In embodiments, ratings component 110 may include information from records to determine or generate a weighted ranking.

In an aspect, ratings component 110 (as well as other components of system 100) may utilize artificial intelligence, statistical models, or other processes and/or algorithms. In embodiments, ratings component 110 may utilize classifiers that map an attribute vector to a confidence that the attribute belongs to a class. For instance, ratings component 110 may input attribute vector, $x=(x1, x2, x3, x4, xn)$ mapped to $f(x)=\text{confidence}(\text{class})$. Such classification can employ a probabilistic and/or statistical based analysis (e.g., factoring into the analysis affinities and ingredient attributes) to infer an action that a user desires to be automatically performed, likely, or the like. In various embodiments, ratings component 110 may utilize other directed and undirected model classification approaches include, e.g., naïve Bayes, Bayesian networks, decision trees, neural networks, fuzzy logic models, and probabilistic classification models providing different patterns of independence. Classification may also include statistical regression that is utilized to develop models of priority.

In accordance with various aspects of the subject specification, an example embodiment may employ classifiers that are explicitly trained (e.g., via a generic training data) as well as implicitly trained (e.g., via observing user behavior, user preferences, historical information, receiving extrinsic information). For example, support vector machines may be configured via learning or training phase within a classifier constructor and feature selection module. Thus, the classifier(s) may be used to automatically learn and perform a number of functions, including but not limited to determining ratings, suggesting actions, or the like. This learning may be on an individual basis, i.e., based solely on a single user, or may apply across a set of or the entirety of the user base. Information from the users may be aggregated and the classifier(s) may be used to automatically learn and perform a number of functions based on this aggregated information. The information may be dynamically distributed, such as through an automatic update, a notification, or any other method or means, to the entire user base, a subset thereof or to an individual user.

Ratings component 110 may provide ratings to other systems or users as output 112 via communications component 120. For instance, ratings component 110 may provide ratings to government bodies, supervisors, officials, social justice organizations, legal authorities, or the like. Further, ratings may be provided to the user as described here as well as elsewhere in this disclosure.

According to embodiments, ratings component 110 may receive an identifier (ID) of an official and may identify a stored or historical rating of the official. For instance, the ratings component 110 may access memory 102 to determine a stored rating for the official. Once retrieved, the ratings component 110 may display the rating via an interface, generate audio or visual alerts, or instruct emergency actions component 140 to perform one or more actions as described here and elsewhere in this disclosure.

The ratings component 110 may receive the ID for the official based on manual user input (e.g., a user entering a badge number, name, license plate number, squad car number, or the like). In another example, the ratings component 110 may communicate (e.g., via communications component 120) with a user device associated with the official, information provided by other users of third-parties (e.g., applications which may identify locations of officials on a GPS mapping service), a server identifying the official, cameras or other devices that may apply pattern recognition to identify the official (e.g., facial recognition, badge number, name, license plate number, squad car number, or the like). According to some embodiments, the user may utilize a first user device and the official may utilize a second user device. Upon the official initiating a stop or interaction, the official's user device may become viewable to the user's user device. The official's user device may transmit identifying information to the user's user device. In at least some examples, the official's user device may transmit one or more of the official's ID, rating, or the like.

In at least one example, the ratings component 110 receives the official's ID and acquires a database for a rating of the official. In other examples, the ratings component 110 receives the official's ID and the rating for the official directly from the official's user device or from a server communicating such the user's user device.

Figure 2:
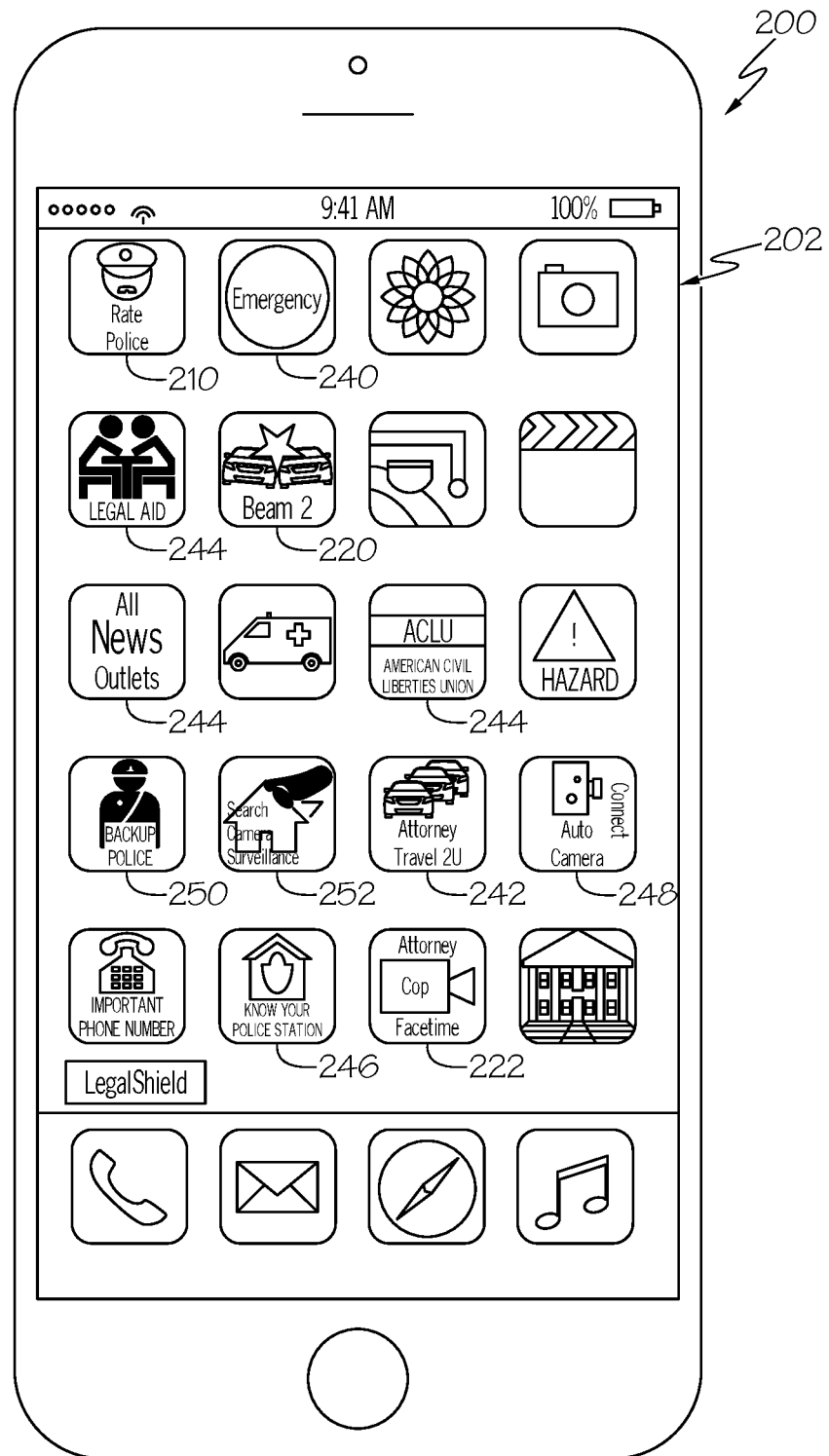
FIG. 2 is a user device rendering a display on an interface in accordance with the present disclosure.

Turning now to FIG. 2, with reference to FIG. 1, there is a user device 200 that may render user interface 202 that may include aspects of system 100. As depicted, the user interface 202 may provide interactive graphical elements that allow a user to access one or more components of system 100. For instance, the user interface 202 may comprise a rating object 210. A user may provide input to a user input device (e.g., touch screen, audio device, gesture, etc.) of the user device 200 to access the rating object 210. The rating object 210 may launch or otherwise provide some or all aspects of ratings component 110 to the user device 200.

Figure 3:
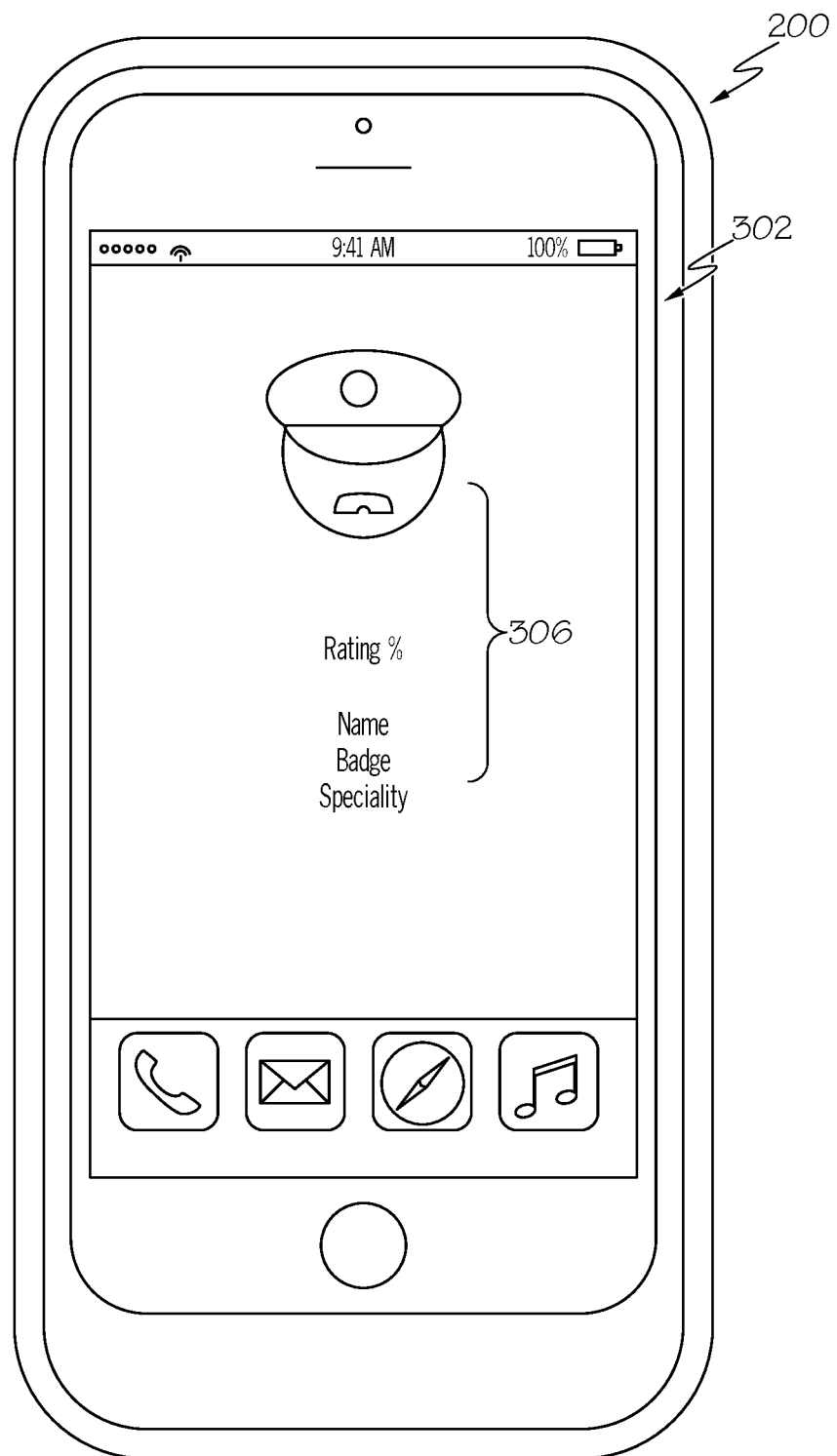
FIG. 3 is a user device rendering a display providing an official's rating on an interface in accordance with the present disclosure.

For instance, as shown in FIG. 3, the user device 200 may render user interface 302 in response to the user selecting the rating object 210 and the ratings component 110 providing information 306 associated with an official. The information 306 may include an image, name, ID, rating, specialty, length of service, or other information.

Turning back to FIG. 1, as described herein, the ratings component 110 may receive the historic rating and other information associated with the official and may communicate the information with the user or intimate aspects of the emergency actions component 140. By way of example, the ratings component 110 may prompt a user for action or may initiate one or more actions based on the historic rating falling below one or more thresholds. For instance, the ratings component 110 may initiate a first set of actions if the rating is below a first threshold, may initiate a second set of actions if the rating is below a second threshold, etc. It is noted that the set of actions may be set by a user, predetermined globally or for some subset of users, based on a learning algorithm or artificial intelligence, or the like.

The emergency actions component 140 may provide one or more actions to the public safety system 106. The emergency actions component 140 may perform or initiate actions or services automatically (e.g., not based on user input) or manually (e.g., based on user input).

According to some embodiments, emergency object 240 may be actuated through user input (e.g., voice, touch, etc.) to launch or initiate one or more aspects of the emergency actions component 140 through one command. For instance, when there is a breakdown between a user and an official, the user may actuate the emergency object 240 and one or more aspects may then launch based on the single actuation. As an example, actuation of emergency object 240 may result in one or more of turning all recording devices on (e.g., image cameras, audio, etc.), generate and transmit notifications to user personal contacts through (e.g., text messages to family and friends, social network notifications), request third party interaction or monitoring (e.g., attorney monitoring, supervisor monitoring, social justice institute monitoring, volunteer monitoring, news outlet monitoring, or the like), contact emergency response agencies (e.g., paramedics, fire department, etc.), being social network transmission (e.g., stream videos, post status updates, identify location, identify official, etc.), identify security cameras that may be able to view the interaction, alert bystanders that may opt in to or otherwise have installed on their user device part or all of the system 100, provide instructions for responding or interaction through identifying user's rights, provide for calming techniques, or the like.

Figure 4:
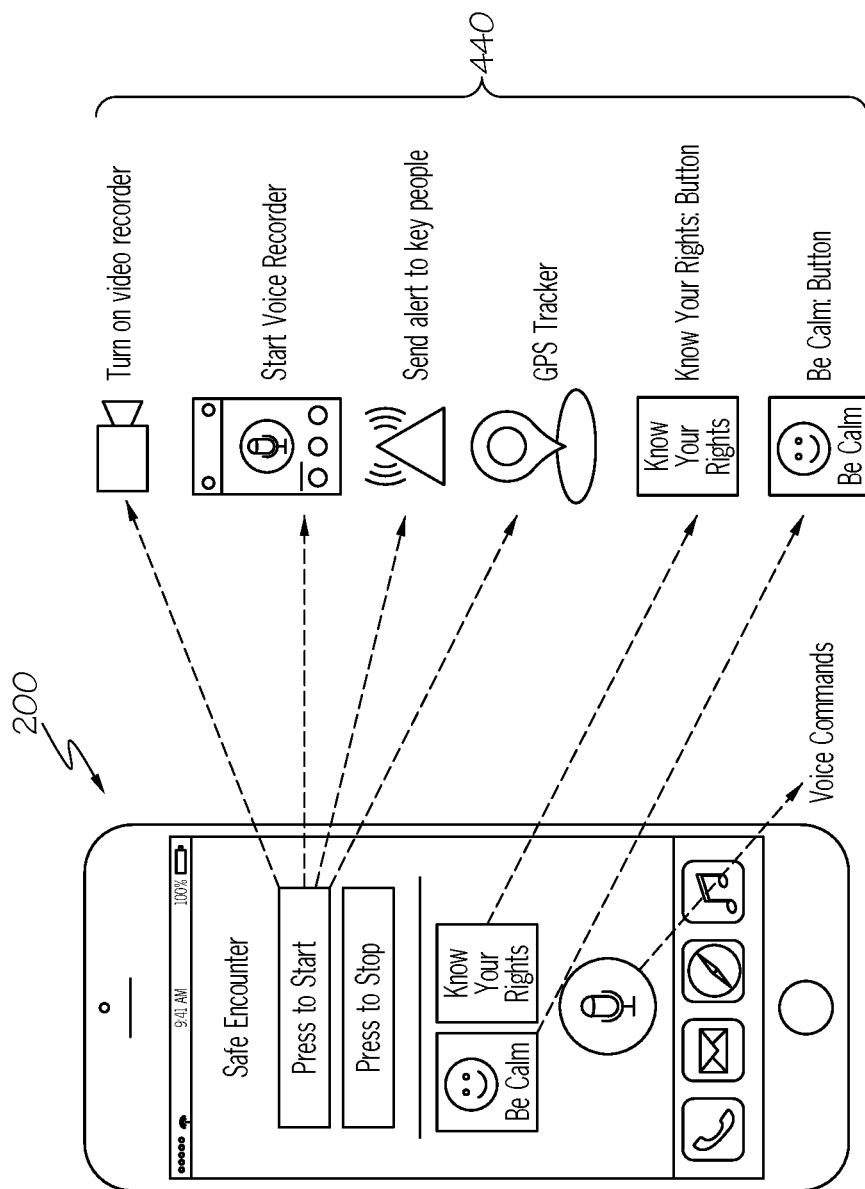
FIG. 4 is a user device rendering a display providing emergency actions on an interface in accordance with the present disclosure.

FIG. 4 illustrates an exemplary illustration of actions 440 that the user device 200 may launch once the emergency object 240 is actuated or upon a rating of an official being identified as below a threshold.

Referring again to FIG. 2, the emergency actions component 140 may include actions that may be initiated by a user interacting with one or more of an attorney request object 242, one or more third party intervention object 244 (e.g., including news outlet, legal search, ambulance or other emergency services, social justice organizations such as the American Civil Liberties Union, etc.), police information object 246, vehicle recording device object 248, supervisor request object 250, and a surveillance search object 252. It is noted that other or different objects may be provided via the interface 202. Moreover, while embodiments may describe actions in response to actuation of one or more objects, it is noted that some actions may occur upon other triggering events. As such, description of one or more aspects of the emergency actions component 140 may correspond to the objects identified in FIG. 2, other objects, or no objects.

In an example, a user may be driving in a vehicle, walking on a street, or may be in a public or private location. The user may be approached by an official or may otherwise see an official in an area. The user may utilize a user device (e.g., user device 200) to access the system 100. It is noted that the user may take caution to reach for the user device 200 in the event that it is in a pocket or otherwise requires the user to place a hand in a concealed area. As such, the user may utilize voice commands, gesture commands, or other commands to access system 100. The user may instruct the emergency actions component 140 to perform one or more actions.

According to at least some embodiments, the official may utilize a user device or other device to access system 100. For instance, as the official approaches an individual or plans to approach an individual, the official may utilize an official's user device to generate a request for information or send the user the official's ID, rating, or the like. The official may indicate to the user that the official has initiated communication and may allow the user time to retrieve the user device and take any appropriate action. In some embodiments, the official may be able to receive information from the user, such as anxiety level, medical information, or the like. It is noted that the user may determine what information is available to an official.

In an aspect, the emergency actions component 140 may initiate recording of interactions via one or more devices. For instance, the emergency actions component 140 may initiate recording by cameras, audio device, or the like. Cameras may include an internal camera of the user device 200, external cameras associated with the user (e.g., dash camera, wearable camera, user's body camera, etc.). Audio device may include internal audio devices of the user device 200, external audio devices (e.g., dash mounted audio devices, wearable devices with audio recording capabilities, etc.). The emergency actions component 140 may record information to local memory storage of the device 200, upload to servers or cloud based memory, stream to social media platforms, or the like. In some embodiments, emergency actions component 140 may automatically or manually send recording information to third parties, such as personal contacts or (e.g., news agencies, government agencies, or the like).

It is noted that the emergency actions component 140 may initiate or request access to third party recording devices. In at least one example, the emergency actions component 140 may generate requests to other users to record an interaction to capture multiple angles or so that the user does not need to interact with device 200. For example, the emergency actions component 140 may generate a request to other user devices identified within a geographical area. Users associated with those other devices may receive alerts and may authorize use of the recording devices or may control the recording devices in response to the request. Recordings from other users may be stored on the other users' devices, may be stored according to the other users' preferences, or may be stored according to the preferences of the user who is subject to the request. For instance, a user may indicate the need for emergency assistance in recording an interaction. Nearby users (e.g., bystanders) may receive a notification of the request and may act to record the interaction. The bystanders who have recorded the information may receive the user's preferences, contacts, or the like and may transmit the recording according thereto. In some embodiments, the bystanders' devices may provide a feed to the user's device. This may allow the recording to be transmitted to the user's device and then sent to the user's personal contacts, legal counsel, news outlets of choice, social justice organizations, social media accounts, or the like.

The emergency actions component 140 may additionally or alternatively generate requests to access an official's recording device, request confirmation that the official's recording device is recording the interaction, or may actuate the official's recording device without receiving recorded content as may be permitted by some jurisdictions. Such recording devices of official's may include one or more of a body camera, hood camera, or other recording device of the official.

According to another aspect, the emergency actions component 140 may initiate contact with third parties. For instance, communication component 120 may generate notifications to news outlet, legal search, ambulance or other emergency services, or social justice organizations such as the American Civil Liberties Union. The notification may include identification of the user, the official, a location, a rating associated with the official, or other information. In some embodiments, a user may include a predetermined message in a notification. Some examples, may allow a user to speak directly with a third party or may allow the emergency actions component 140 to send video, audio, transcripts, or other information associated with the encounter to third parties.

The emergency actions component 140 may additionally or alternatively provide access to legal counsel. For instance, the emergency actions component 140 may allow a user to request emergency legal counsel through a search, may request information on rights, view or access information on rights, view or access guides for interaction, or the like. According to some embodiments, a user may engage with legal counsel or a legal organization before, during, or after an encounter as may be permitted by law. For instance, the user may have a preexisting attorney-client relationship with legal counsel. The legal counsel may be alerted of an emergency through the emergency actions component 140 and may receive information pertaining to an interaction. Legal counsel may be given access to live feeds, recorded information, a geographic location or the like. In some embodiments, emergency actions component 140 may request that legal counsel travel to a location of an interaction on the client's behalf. The legal counsel may be able to deescalate the situation and provide immediate legal assistance.

In embodiments, the emergency actions component 140 may identify surveillance equipment or other devices that may have access to an interaction. For instance, emergency actions component 140 may initiate a search for surveillance equipment that may be within a geographic location associated with an interaction, may have passed by or observed an interaction (e.g., cameras of other users, cameras of other vehicles, or the like), or other surveillance equipment that may be identified as having potentially observed some or all aspects of an interaction. It is noted that third parties who control such surveillance equipment may opt in to allow identification of such surveillance equipment. According to some examples, the emergency actions component 140 may direct a user to travel to a particular area that can be observed by such surveillance equipment or other devices, as long as the user is in compliance with official's orders. Moreover, emergency actions component 140 may notify officials that actions are under surveillance As described herein, communications component 120 may interact with emergency actions component 140 and other components to accomplish various tasks. Such tasks may include generating messages to key contacts in the event of an emergency or interaction. The key contacts may include family, friends, attorneys, or others as specified by the user. Contact may be made by short-messaging services (SMS), text messages, social media networks, or other networks as described herein. In examples, communications component 120 may transmit a prerecord message, an audio or video clip, information pertaining to an interaction (e.g., location, official involved, official rating, actions taken, location of recordings, location of surveillance equipment, etc.).

In another aspect, communications component 120 may allow for communication with an official prior to a face-to-face encounter. For example, the user or official may request a video, audio, or alphanumerical conversation between the user and the official. The communications component 120 may establish a secure connection between a device associated with the user and a device associated with the official. This may allow the official and the user to provide information and gauge the current situation. In some examples, the official may be able to identify that the user is under duress, fears for the user's safety, or otherwise may require intervention to deescalate the situation. The official may call for backup, supervisions, social workers, counselors, religious leaders, or others to assist in de-escalation.

Moreover, communications component 120 may utilize bump, near filed communications, or other technology to allow the user and official to communicate when in proximity to each other. This may provide security as well as accuracy for the interaction. As another aspect, the user device 200 may verify the interaction with a device of the official. This may prevent third parties from providing ratings of an official when the third parties may have never interacted with the official.

Figure 5:
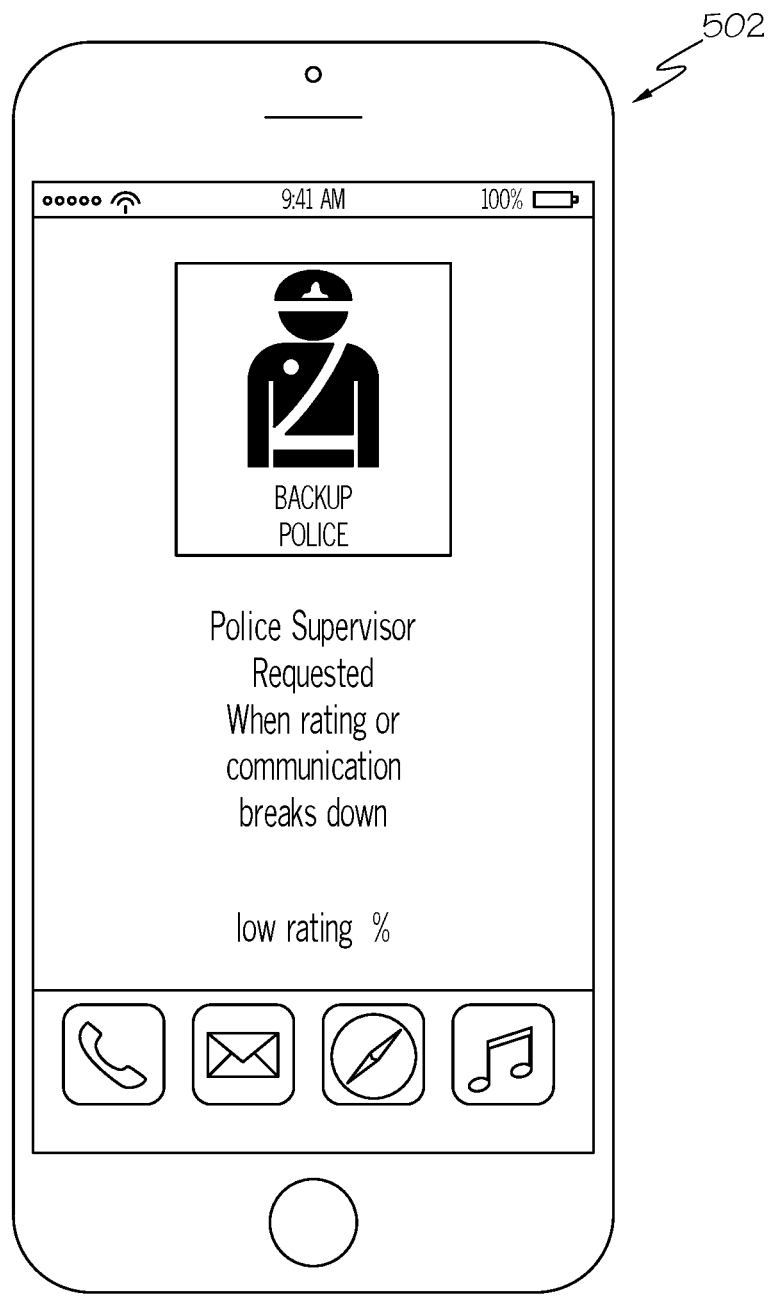
FIG. 5 is a user device rendering a display providing a request for a supervisor on an interface in accordance with the present disclosure.

FIG. 5 illustrates an interface 502 corresponding to emergency actions component 140 initiating contact of supervisor for the official during an interaction. In some embodiments, non-supervising officials may be contacted, such as officials having high ratings and within a specified proximity of the user.

Figure 6:
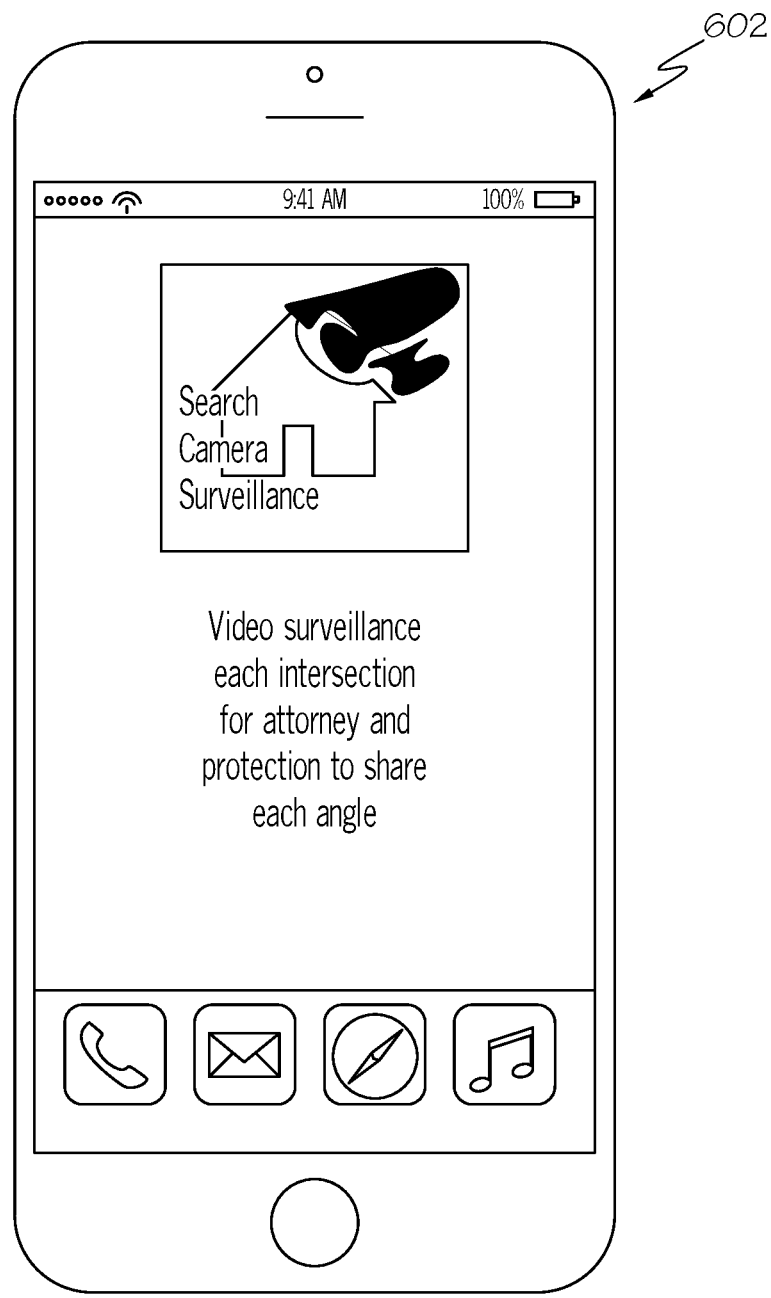
FIG. 6 is a user device rendering a display providing identification of surveillance equipment on an interface in accordance with the present disclosure.

FIG. 6 illustrates an interface 602 corresponding to emergency actions component 140 initiating a search for surveillance equipment that may be within a geographic location associated with an interaction, may have passed by or observed an interaction (e.g., cameras of other users, cameras of other vehicles, or the like), or other surveillance equipment that may be identified as having potentially observed some or all aspects of an interaction.

Figure 7:
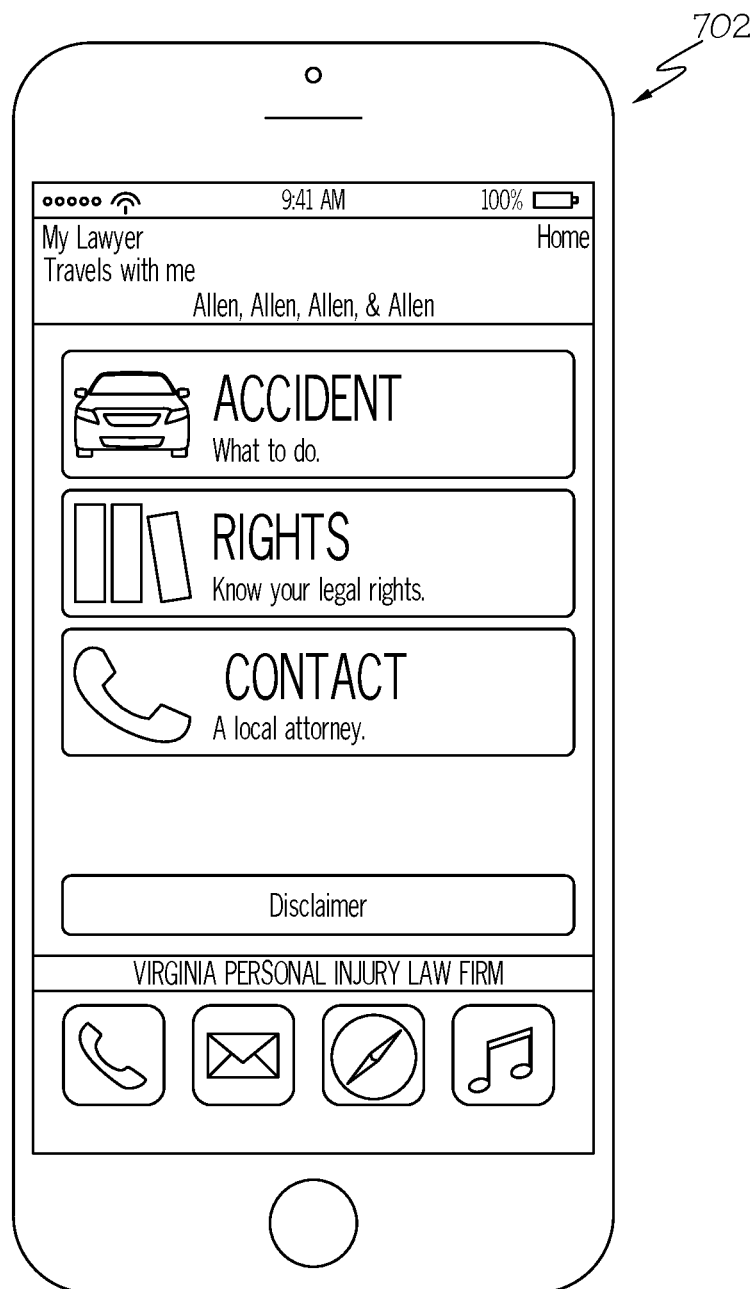
FIG. 7 illustrates a user device rendering a display providing legal assistance on an interface in accordance with the present disclosure.
Figure 8:
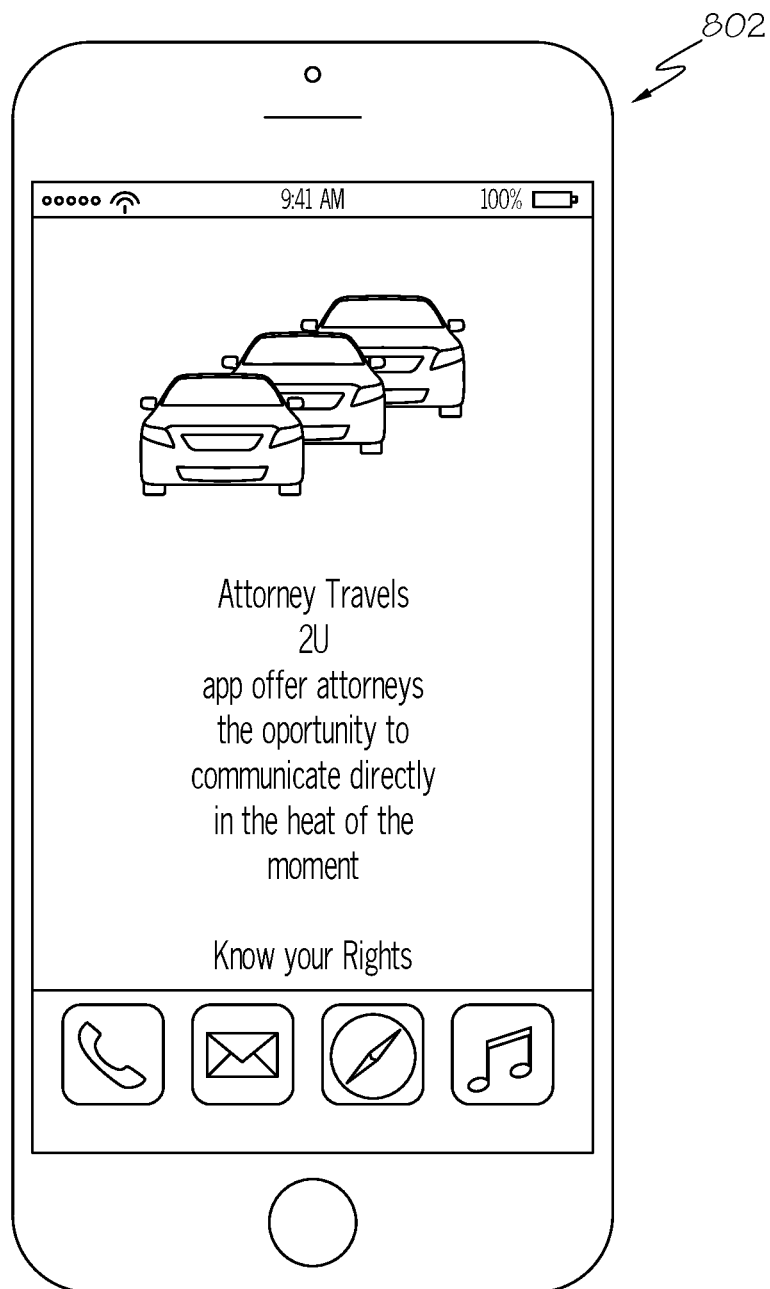
FIG. 8 is a user device rendering a display providing legal assistance services on an interface in accordance with the present disclosure.

FIG. 7 illustrates an interface 702 corresponding to emergency actions component 140 initiating a search for legal assistance, legal rights, or for information on how to proceed with an interaction. In some examples, the interface 702 may include video, audio, textual, or other instructions on how to interact with an official FIG. 8 illustrates an interface 802 corresponding to emergency actions component 140 initiating attorney communications. Such communications may include requests for an attorney to travel to a user's location, video or audio conferencing of an attorney to observe an interaction or instruct a user's actions, or the like.

Figure 9:
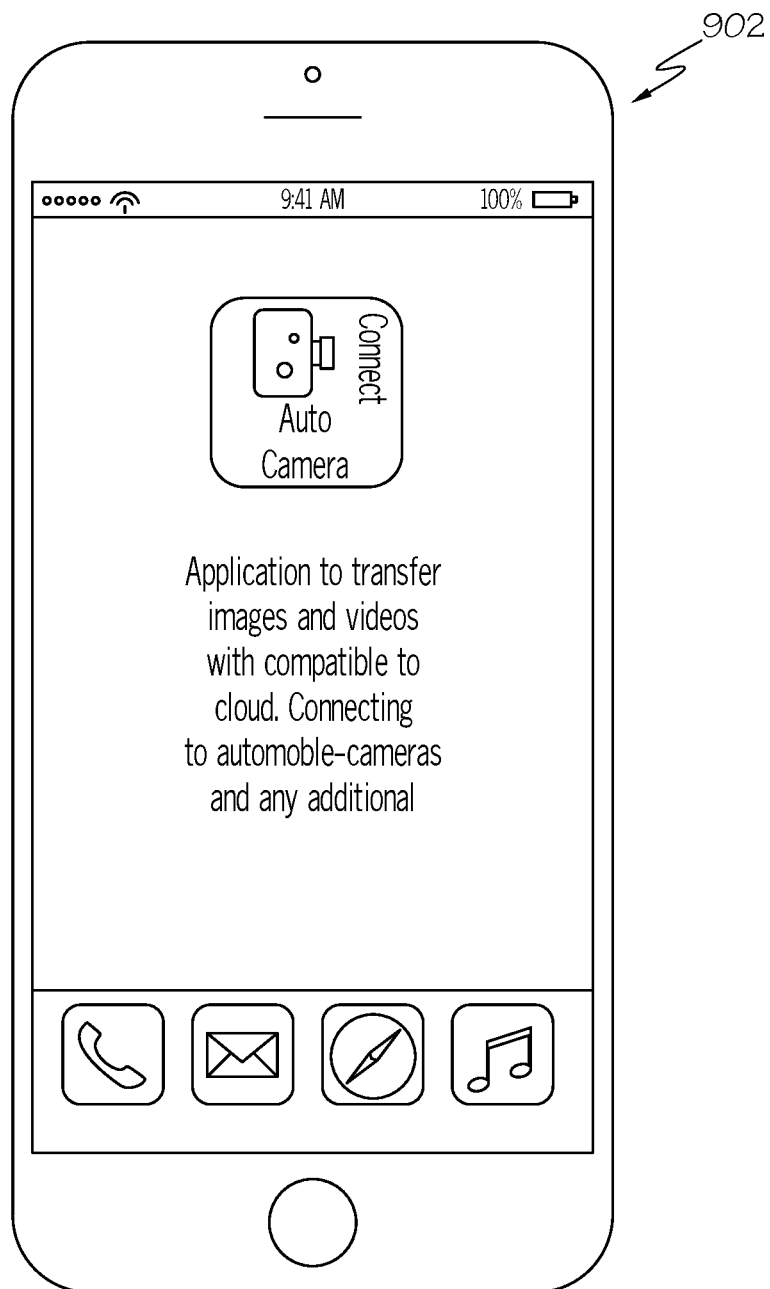
FIG. 9 is a user device rendering a display providing connectivity to external cameras on an interface in accordance with the present disclosure.

FIG. 9. illustrates an interface 902 corresponding to emergency actions component 140 initiating actuation of one or more external cameras. As described herein, the external cameras may comprise original equipment manufacturer installed cameras on a vehicle, third party cameras (e.g., dash cameras), cameras of other vehicles of bystanders or the like.

Figure 10:
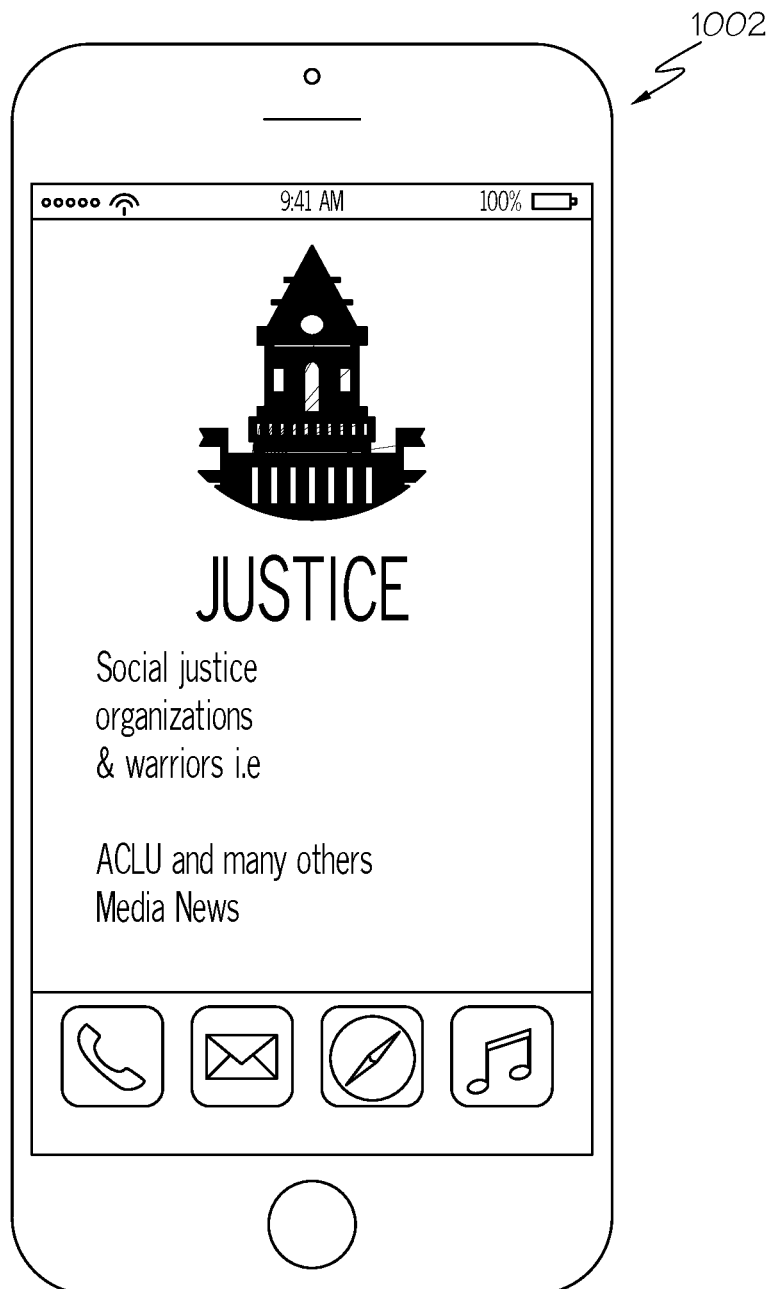
FIG. 10 is a user device rendering a display providing access to third-parties on an interface in accordance with the present disclosure.

FIG. 10 illustrates an interface 1002 corresponding to emergency actions component 140 initiating contact to third parties including news outlet, legal search, ambulance or other emergency services, social justice organizations such as the American Civil Liberties Union, or the like.

Figure 11:
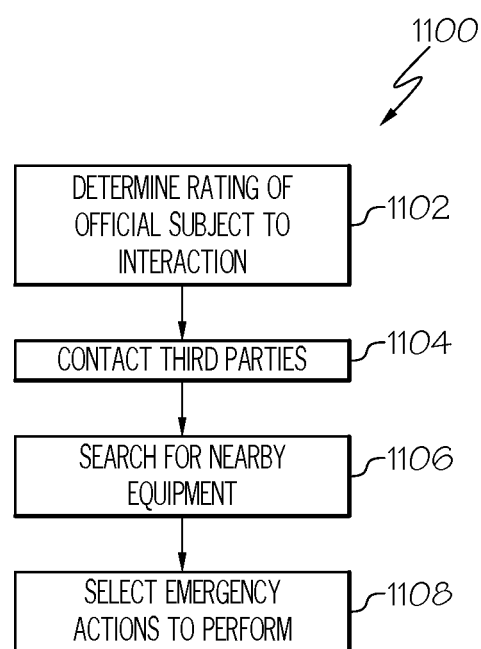
FIG. 11 is an exemplary flow diagram of a method for providing a public safety system in accordance with the present disclosure.
Figure 12:
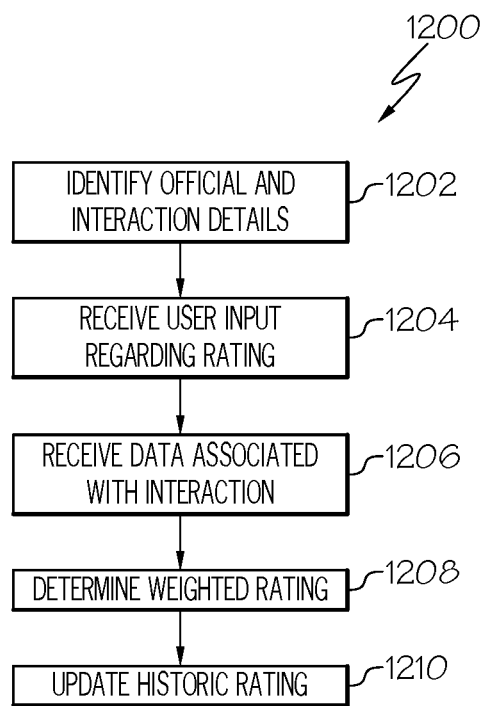
FIG. 12 is an exemplary flow diagram of a method for rating an official in accordance with the present disclosure.

In view of the subject matter described herein, methods that may be related to various embodiments may be better appreciated with reference to the flowcharts of FIGS. 11-12. While the methods are shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

FIG. 11 depicts an exemplary flowchart of non-limiting method 1100 associated with a public safety systems, according to various aspects of the subject disclosure. As an example, method 1100 may determine a blending process based on contents of a blending device and blending preferences. Further, method 1100 may facilitate implementation of some or all parts of described embodiments.

At 1102, a system (e.g., system 100) may determine a rating of an official subject to an interaction. For instance, a system may identify the official and may query a database to identify a rating associated with the official. In another example, the system may receive a rating from the official through an official's user device.

At 1104 the system may contact third parties 1104. In an example, the system may contact third parties based on user input after reviewing a rating or may do so automatically based on the rating being below a threshold.

At 1106, the system may search for nearby equipment. The equipment may be surveillance equipment, third party equipment, or the like. It is noted that the system may search for equipment before, during, or after an interaction.

At 1108, the system may select emergency actions to perform. Such actions may be selected automatically, according to predetermine preferences, or manually by a user.

FIG. 12 depicts an exemplary flowchart of non-limiting method 1200 associated with public safety systems, according to various aspects of the subject disclosure. As an example, method 1200 may determine a rating of an official based on an interaction. Further, method 1200 may facilitate implementation of some or all parts of described embodiments.

At 1200, a system (e.g., system 100) may identify an official and interaction details. The official may be identified based on manual or automatic input. For instance, a user may enter an ID of an official, the official may provide information, or the like. Location information or other environmental information may also be identified, At 1204, the system may receive user input regarding a rating, such as a user rating the interaction based on a subjective score (e.g., numerical score, etc.).

At 1206, the system may receive data associated with the interaction such as biometric information, length of interaction, recorded audio or video information, or the like. Such information may indicate objective scoring parameters.

At 1208, the system may determine a weighted rating of the official based at least on the user input and input associated with the interaction. In some embodiments, the weighting may factor in how a user has rated officials in the past.

At 1210, the system may update a historic rating for an official. This may include applying the user's rating from 1208 to an algorithm to update a global rating for an official.

Figure 13:
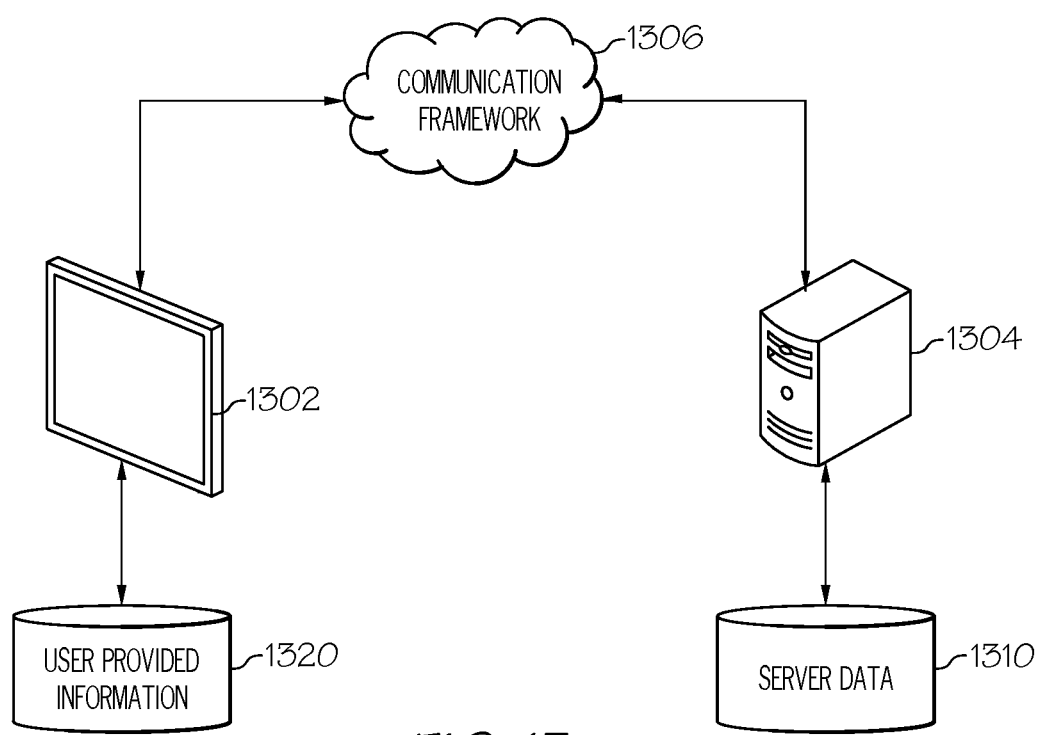
FIG. 13 is an example network in accordance with the present disclosure.
Figure 14:
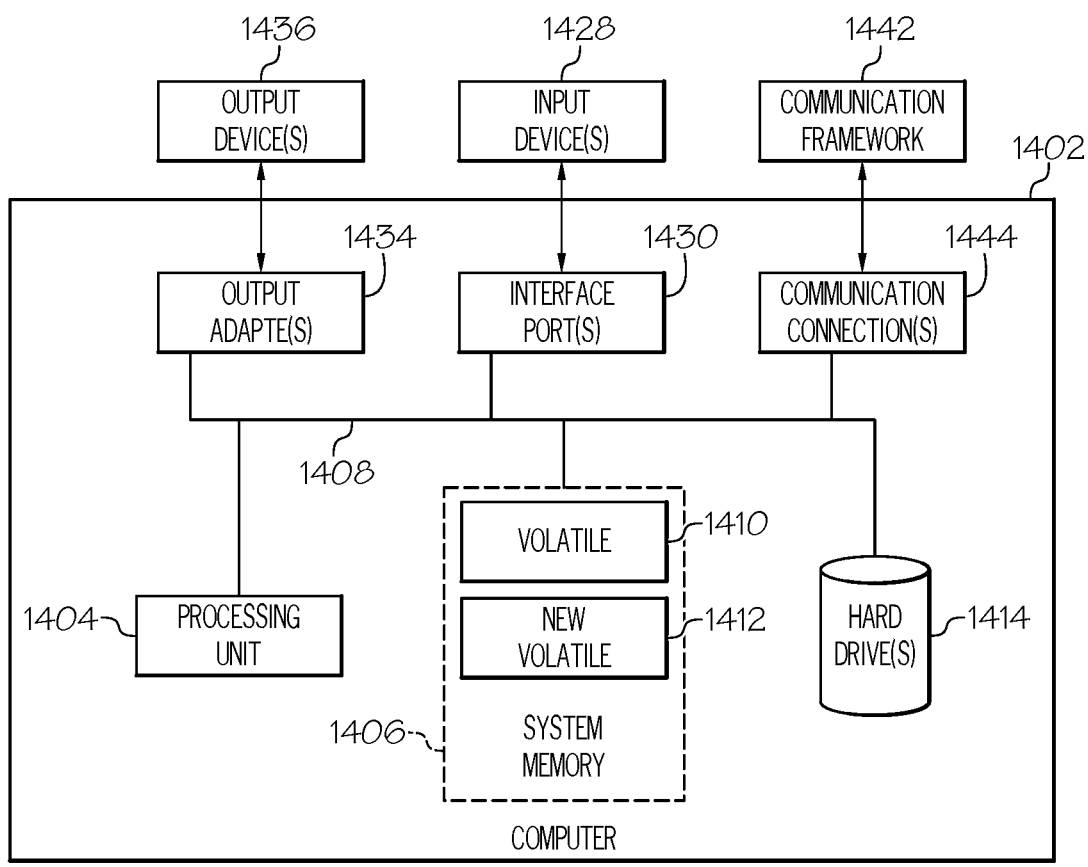
FIG. 14 is an example operating environment in accordance with the present disclosure.

What has been described above may be further understood with reference to the following figures. FIGS. 13 and 14 provide exemplary operating environments or systems capable of implementing one or more systems, apparatuses, or processes described above. FIGS. 13 and 14 are not intended to limit the scope of such systems, apparatuses, or processes. By way of example, computing environment 1300 may refer to one or more embodiment of the various embodiments described with reference to the above figures. However, variations to computing environment 1300 may be obvious to achieve aspects or processes described herein.

FIG. 13 is a schematic diagram of a computing environment 1300 in accordance with various disclosed aspects. It is noted that computing environment 1300 may include various other components or aspects. As depicted, computing environment 1300 may include one or more client(s) 1302, one or more server(s) 1304, one or more client data store(s) 1320, one or more server data store(s) 1310, and a communication framework 1306.

While depicted as a desktop computer(s), client(s) 1302 may include various other devices that may comprise hardware and/or software (e.g., program threads, processes, computer processors, non-transitory memory devices, etc.). In an example, client(s) 1302 may include laptop computers, smart phones, tablet computers, wearables, etc. The client(s) 1302 may include or employ various aspects disclosed herein. For example, client(s) 1302 may include or employ all or part of various systems and processes disclosed herein.

Likewise, server(s) 1304 may include various devices that may comprise hardware and/or software (e.g., program threads, processes, computer processors, non-transitory memory devices, etc.). Server(s) 1304 may include or employ various aspects disclosed herein. For example, server(s) 1304 may include or employ all or part of various systems and processes disclosed herein. It is noted that server(s) 1304 and client(s) 1302 may communicate via communication framework 1306. In an exemplary communication, client(s) 1302 and server(s) 1304 may utilize packeted data (e.g., data packets) adapted to be transmitted between two or more computers. For instance, data packets may include coded information associated with printing requests, orders, available printers, parameters associated with print-receptive media, or the like.

Communication framework 1306 may comprise various network devices (e.g., access points, routers, base stations, etc.) that may facilitate communication between client(s) 1302 and server(s) 1304. It is noted that various forms of communications may be utilized, such as wired (e.g., optical fiber, twisted copper wire, etc.) and/or wireless (e.g., cellular, Wi-Fi, NFC, etc.) communications.

In various embodiments, client(s) 1302 and server(s) 1304 may respectively include or communicate with one or more client data store(s) 1320 or one or more server data store(s) 1310. The data stores may store data local to client(s) 1302 or server(s) 1304.

In at least one embodiment, a client of client(s) 1302 may transfer data describing a print order, user account data, printer device data, or the like to a server of server(s) 1304. The server may store the data and/or employ processes to alter the data. For example, the server may transmit the data to other clients of client(s) 1302.

FIG. 14 is a block diagram of a computer system 1400 that may be employed to execute various disclosed embodiments. It is noted that various components may be implemented in combination with computer-executable instructions, hardware devices, and/or combinations of hardware and software devices that may be performed by computer system 1400.

Computer system 1400 may include various components, hardware devices, software, software in execution, and the like. In embodiments, computer system 1400 may include computer 1402. Computer 1402 may include a system bus 1408 that couples various system components. Such components may include a processing unit(s) 1404, system memory device(s) 1406, disk storage device(s) 1414, sensor(s) 1435, output adapter(s) 1434, interface port(s) 1430, and communication connection(s) 1444. One or more of the various components may be employed to perform aspects or embodiments disclosed herein. In an aspect, the computer system 1400 may "learn," such as described above user preferences based upon modifications of workout routines by users, through the rating of workout routine both positively and negatively. For example, the computer system 1400 may modify a particular workout routine (or a set thereof) as the majority of users or supermajority thereof have disapproved of the workout routine (such as for strength, speed, cardiovascular challenge, length of time, or a variety of these factors). The computer system 1400 may dynamically push out the revised workout routine or receive the revised workout routine as applicable.

The processing unit(s) 1404 may comprise various hardware processing devices, such as single-core or multi-core processing devices. Moreover, processing unit(s) 1404 may refer to a "processor", "controller", "computing processing unit (CPU)", or the like. Such terms generally relate to a hardware device. Additionally, processing unit(s) 1404 may include an integrated circuit, an application specific integrated circuit (ASIC), a digital signal processor (DSP), a field-programmable gate array (FPGA), a programmable logic controller (PLC), a complex programmable logic device (CPLD), a discrete gate or transistor logic, discrete hardware components, or the like.

System memory 1406 may include one or more types of memory, such volatile memory 1410 (e.g., random access memory (RAM)) and non-volatile memory 1412 (e.g., read-only memory (ROM)). ROM may include erasable programmable ROM (EPROM), electrically erasable programmable ROM (EEPROM). In various embodiments, processing unit(s) 1404 may execute computer executable instructions stored in system memory 1406, such as operating system instructions and the like.

Computer 1402 may also include one or more hard drive(s) 1414 (e.g., EIDE, SATA). While hard drive(s) 1414 are depicted as internal to computer 1402, it is noted that hard drive(s) 1414 may be external and/or coupled to computer 1402 via remote connections. Moreover, input port(s) 1430 may include interfaces for coupling to input device(s) 1428, such as disk drives. Disk drives may include components configured to receive, read and/or write to various types of memory devices, such as magnetic disks, optical disks (e.g., compact disks and/or other optical media), flash memory, zip drives, magnetic tapes, and the like.

It is noted that hard drive(s) 1414 and/or other disk drives (or non-transitory memory devices in general) may store data and/or computer-executable instructions according to various described embodiments. Such memory devices may also include computer-executable instructions associated with various other programs or modules. For instance, hard drives(s) 1414 may include operating system modules, application program modules, and the like. Moreover, aspects disclosed herein are not limited to a particular operating system, such as a commercially available operating system.

Input device(s) 1428 may also include various user interface devices or other input devices, such as sensors (e.g., microphones, pressure sensors, light sensors, etc.), scales, cameras, scanners, facsimile machines, and the like. A user interface device may generate instructions associated with user commands. Such instructions may be received by computer 1402. Examples of such interface devices include a keyboard, mouse (e.g., pointing device), joystick, remote controller, gaming controller, touch screen, stylus, and the like. Input port(s) 1430 may provide connections for the input device(s) 1428, such as via universal serial ports USB ports), infrared (IR) sensors, serial ports, parallel ports, wireless connections, specialized ports, and the like.

Output adapter(s) 1434 may include various devices and/or programs that interface with output device(s) 1436. Such output device(s) 1436 may include LEDs, computer monitors, touch screens, televisions, projectors, audio devices, printing devices, or the like.

In embodiments, computer 1402 may be utilized as a client and/or a server device. As such, computer 1402 may include communication connection(s) 1444 for connecting to a communication framework 1442. Communication connection(s) 1444 may include devices or components capable of connecting to a network. For instance, communication connection(s) 1444 may include cellular antennas, wireless antennas, wired connections, and the like. Such communication connection(s) 1444 may connect to networks via communication framework 1442. The networks may include wide area networks, local area networks, facility or enterprise-wide networks (e.g., intranet), global networks (e.g., Internet), satellite networks, and the like. Some examples of wireless networks include Wi-Fi, Wi-Fi direct, BLUETOOTH™, Zigbee, and other 802.XX wireless technologies. It is noted that communication framework 1442 may include multiple networks connected together. For instance, a Wi-Fi network may be connected to a wired Ethernet network.

Figure 15:
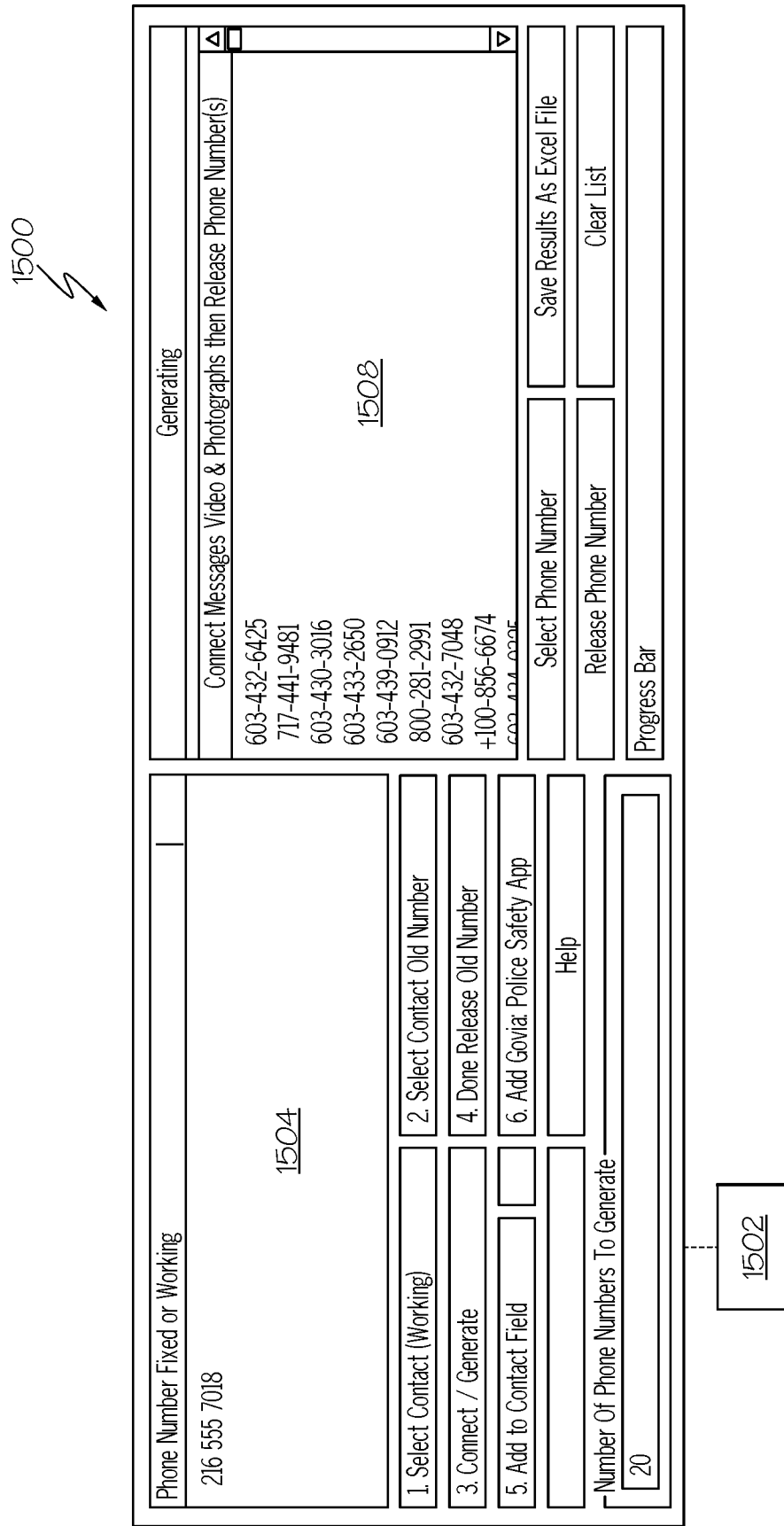
FIG. 15 is a user device rendering a display on an interface of another embodiment for linking of text feeds for mobile devices in accordance with the present disclosure.

Turning to FIG. 15, there is an interface 1500 for an application tool 1502 that merges messaging streams from a first contact to a second contact. For instance, the application tool 1502 may take an existing thread associated with the second contact with a messaging stream (e.g., text messaging, email messaging, media messaging, or the like) and release the first contact. As an example, when a user receives an updated contact, such as a new cellular number, the message streams between the user and other users does not carry over with the user's updated contact. Thus, any correspondence between the user and other users creates a new message stream. This may result in inefficiencies, loss of message streams, and confusion for users.

Interface 1500, which may be controlled by an application tool 1502 installed as software or an "app" on a user's mobile device or computing device, may merge messaging streams without loss of messaging content. For instance, a user may identify a new or working contact at 1504. The user may then identify one or more other or old contacts at 1508. The user may select to merge the messaging streams and the application tool 1502 may automatically merge the messaging stream such that the user's conversation with the other or old contacts 1508 is now within a messaging stream for the new contact 1504.

According to some embodiments, the application tool 1502 may automatically identify the new or working contact 1504 and the one or more other or old contacts 1508 based on a machine learning or probabilistic analysis algorithm. For example, the application tool 1502 may identify contact information sent in a message, analyze content of a message to determine patterns (e.g., common phrases, use of emojis, use of media content, image recognition of faces, etc.), or the like to identify that the new or working contact 1504 is associated with the same user of the one or more other or old contacts 1508. It is noted that the application tool 1502 may identify the relationship between the contacts 1504, 1508 based on determining a likelihood that that the users are the same user.

Figure 16:
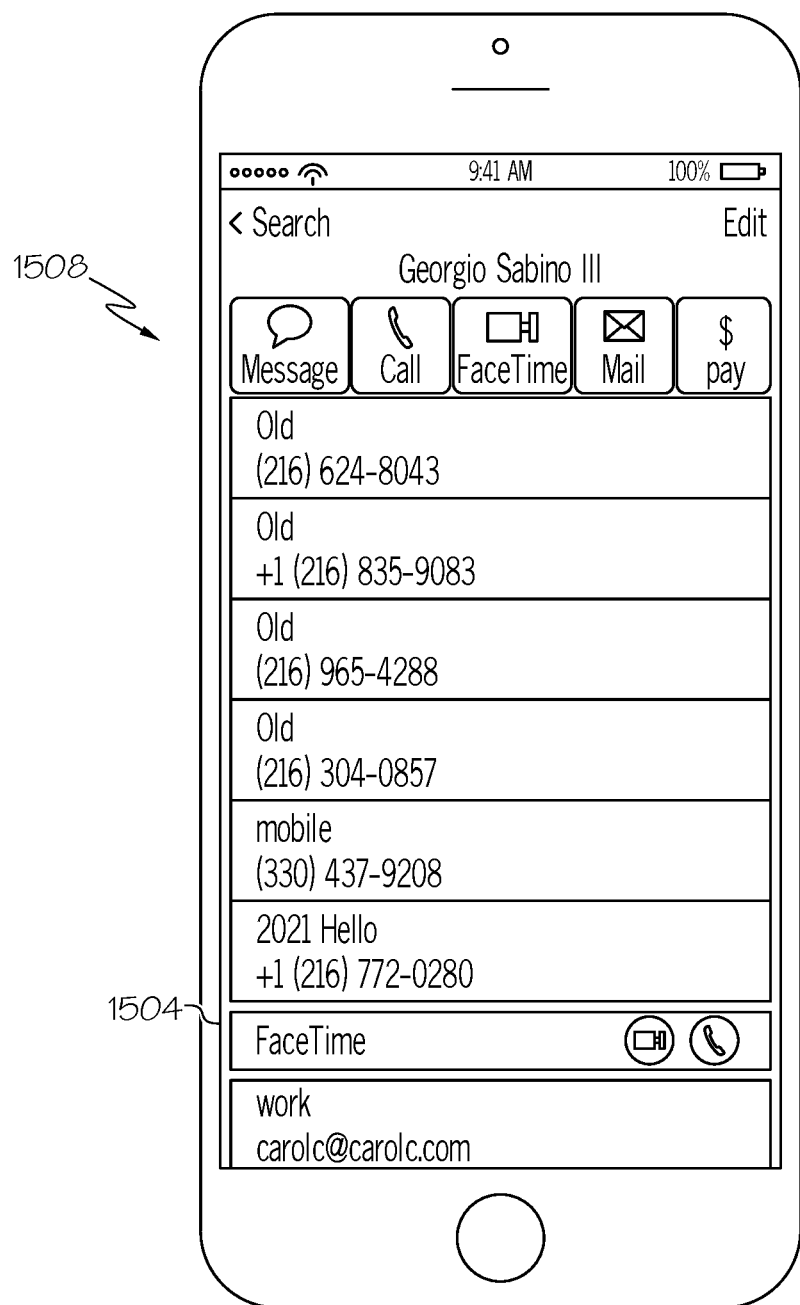
FIG. 16 is a user device rendering of a user device according to the embodiment of FIG. 15.

Turning to FIG. 16, there is an exemplary interface 1600 of a contact identifying other or old contacts 1508 and a new or working contact 1504. In examples, the contact information may be store or updated to a user's device, a cloud, shared with others within a network, or the like.

The terms "component," "module," "system," "interface," "platform," "service," "framework", "connector", "controller", or the like are generally intended to refer to a computer-related entity. Such terms may refer to at least one of hardware, software, or software in execution. For example, a component may include a computer-process running on a processor, a processor, a device, a process, a computer thread, or the like. In another aspect, such terms may include both an application running on a processor and a processor. Moreover, such terms may be localized to one computer and/or may be distributed across multiple computers.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define embodiments disclosed herein. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Aspects Listing

Aspect 1. A method implemented by a computing device of a user may comprise receiving, from an external device of an individual, identification data of the individual associated with the external device, accessing from one or more databases, by the computing device of the user, ratings data specific to the individual, the ratings data is based on historical interactions of the individual, comparing the ratings data with one or more of a plurality of threshold values, determining, based on the comparing, whether the ratings data satisfies one or more of the plurality of threshold values, and initiating one or more of a plurality of action sets responsive to the ratings data satisfying the one or more of the plurality of threshold values.

Aspect 2. The method of Aspect 1, further comprising activating, responsive to receiving the data identifying the individual, a software application operating on the computing device of the user, and outputting, on a display of the computing device, the data identifying the individual associated with the external device using the software application.

Aspect 3. The method of Aspect 1, further comprising identifying a camera at a location within a vicinity of the computing device of the user.

Aspect 4. The method of Aspect 3, further comprising generating instructions informing the user to travel to the location of the camera, and outputting the instructions on a display of the computing device.

Aspect 5. The method of Aspect 1, wherein the initiating of the one or more of the plurality of action sets responsive to the ratings data satisfying the one or more of the plurality of threshold values includes: activating, responsive to an input from the user, an audio recording component that is included as part of the computing device of the user, and activating, responsive to an additional input from the user, an image capturing component that is included as part of the computing device of the user.

Aspect 6. The method of Aspect 1, wherein the initiating of the one or more of the plurality of action sets responsive to the ratings data satisfying the one or more of the plurality of threshold values includes transmitting, responsive to an input from the user, text messages to target devices that are external to and independent of the computing device.

Aspect 7. The method of Aspect 1, wherein the initiating of the one or more of the plurality of action sets responsive to the ratings data satisfying the one or more of the plurality of threshold values includes: automatically activating an audio recording component that is included as part of the computing device of the user, automatically activating an image capturing component that is included as part of the computing device of the user, and automatically transmitting text messages to target devices that are external to and independent of the computing device.

Aspect 8. The method of Aspect 1, further comprising activating, responsive to receiving the data identifying the individual, a software application operating on the computing device of the user, and receiving in real time, from the external device, a request for a video conference with the user.

Aspect 9. The method of Aspect 8, further comprising accepting in real time, by the computing device, the request for the video conference based on an input from the user, establishing, by the computing device using the software application, a secure connection between the computing device and the external device the video conference, and performing the video conference via a display of the computing device and an additional display included as part of the external device, the video conference including the user and the individual.

Aspect 10. The method of Aspect 9, further comprising receiving, responsive to an additional input from the user via the software application, an input of a new rating specific to the individual, the input of the new rating is based on the video conference that includes the user and the individual, and updating the ratings data specific to the individual to include the new rating.

Aspect 11. A system comprises one or more processors included as part of a computing device, and non-transitory computer readable medium storing instructions that, when executed by the one or more processors, cause the computing device to receive, from an external device of an individual, identification data of the individual associated with the external device, access, from one or more databases, ratings data specific to the individual, the ratings data is based on historical interactions of the individual, compare the ratings data with one or more of a plurality of threshold values, determine, based on the comparing, whether the ratings data satisfies one or more of the plurality of threshold values, and initiate one or more of a plurality of action sets responsive to the ratings data satisfying the one or more of the plurality of threshold values.

Aspect 12. The system of Aspect 11, wherein the non-transitory computer readable medium storing instructions that, when executed by the one or more processors, further cause the computing device to activate, responsive to receiving the data identifying the individual, a software application operating on the computing device of the user, and output, on a display of the computing device, the data identifying the individual associated with the external device using the software application.

Aspect 13. The system of Aspect 11, wherein the non-transitory computer readable medium storing instructions that, when executed by the one or more processors, further cause the computing device to identify a camera at a location within a vicinity of the computing device of the user.

Aspect 14. The system of Aspect 13, wherein the non-transitory computer readable medium storing instructions that, when executed by the one or more processors, further cause the computing device to generate instructions informing the user to travel to the location of the camera, and outputting the instructions on a display of the computing device.

Aspect 15. The system of Aspect 11, wherein the non-transitory computer readable medium storing instructions that, when executed by the one or more processors, further cause the computing device to activate, responsive to an input from the user, an audio recording component that is included as part of the computing device of the user, and activate, responsive to an additional input from the user, an image capturing component that is included as part of the computing device of the user.

Aspect 16. The system of Aspect 11, wherein the non-transitory computer readable medium storing instructions that, when executed by the one or more processors, causes the computing device to initiate the one or more of the plurality of action sets responsive to the ratings data satisfying the one or more of the plurality of threshold values by transmitting, responsive to an input from the user, text messages to target devices that are external to and independent of the computing device.

Aspect 17. The system of Aspect 11, wherein the non-transitory computer readable medium storing instructions that, when executed by the one or more processors, causes the computing device to initiate the one or more of the plurality of action sets responsive to the ratings data satisfying the one or more of the plurality of threshold values by automatically activating an audio recording device that is included as part of the computing device of the user, automatically activating an image capturing device that is included as part of the computing device of the user, and automatically transmitting text messages to target devices that are external to and independent of the computing device.

Aspect 18. The system of Aspect 11, wherein the non-transitory computer readable medium storing instructions that, when executed by the one or more processors, further cause the computing device to activate, responsive to receiving the data identifying the individual, a software application operating on the computing device of the user, and receive in real time, from the external device, a request for a video conference with the user.

Aspect 19. The system of Aspect 18, wherein the non-transitory computer readable medium storing instructions that, when executed by the one or more processors, further cause the computing device to accept in real time, by the computing device, the request for the video conference based on an input from the user, establish, by the computing device using the software application, a secure connection between the computing device and the external device the video conference, and perform the video conference via a display of the computing device and an additional display included as part of the external device, the video conference including the user and the individual.

Aspect 20. The system of Aspect 19, wherein the non-transitory computer readable medium storing instructions that, when executed by the one or more processors, further cause the computing device to receive, responsive to an additional input from the user via the software application, a new rating specific to the individual, the input of the new rating is based on the video conference that includes the user and the individual, and update the ratings data specific to the individual to include the new rating.

What is claimed is:

1. A method implemented by a computing device of a user, the method comprising:
   receiving, from an external device of an individual, identification data of the individual associated with the external device;
   identifying a camera at a location within a vicinity of the computing device of the user;
   generating instructions informing the user to travel to the location of the camera;
   outputting the instructions on a display of the computing device;
   accessing from one or more databases, by the computing device of the user, ratings data specific to the individual, the ratings data is based on historical interactions of the individual with one or more other users;
   comparing the ratings data with one or more of a plurality of threshold values;
   determining, based on the comparing, whether the ratings data satisfies one or more of the plurality of threshold values; and
   initiating one or more of a plurality of action sets responsive to the ratings data satisfying the one or more of the plurality of threshold values.

2. The method of claim 1, further comprising:
   activating, responsive to receiving the data identifying the individual, a software application operating on the computing device of the user; and
   outputting, on a display of the computing device, the data identifying the individual associated with the external device using the software application.

3. The method of claim 1, wherein the initiating of the one or more of the plurality of action sets responsive to the ratings data satisfying the one or more of the plurality of threshold values includes:
   activating, responsive to an input from the user, an audio recording component that is included as part of the computing device of the user; and
   activating, responsive to an additional input from the user, an image capturing component that is included as part of the computing device of the user.

4. The method of claim 1, wherein the initiating of the one or more of the plurality of action sets responsive to the ratings data satisfying the one or more of the plurality of threshold values includes transmitting, responsive to an input from the user, text messages to target devices that are external to and independent of the computing device.

5. The method of claim 1, wherein the initiating of the one or more of the plurality of action sets responsive to the ratings data satisfying the one or more of the plurality of threshold values includes:
   automatically activating an audio recording component that is included as part of the computing device of the user;
   automatically activating an image capturing component that is included as part of the computing device of the user; and
   automatically transmitting text messages to target devices that are external to and independent of the computing device.

6. The method of claim 1, further comprising:
   activating, responsive to receiving the data identifying the individual, a software application operating on the computing device of the user; and
   receiving in real time, from the external device, a request for a video conference with the user.

7. The method of claim 6, further comprising:
   accepting in real time, by the computing device, the request for the video conference based on an input from the user;
   establishing, by the computing device using the software application, a secure connection between the computing device and the external device the video conference; and
   performing the video conference via a display of the computing device and an additional display included as part of the external device, the video conference including the user and the individual.

8. The method of claim 7, further comprising:
   receiving, responsive to an additional input from the user via the software application, an input of a new rating specific to the individual, the input of the new rating is based on the video conference that includes the user and the individual; and
   updating the ratings data specific to the individual to include the new rating.

9. The method of claim 1, wherein the ratings data based on historical interactions of the individual with one or more other users comprises at least one of:
   ratings data based on user feedback provided by the one or more other users; or
   ratings data based on information generated by one or more sensors during the historical interactions of the individual with one or more other users, wherein the one or more sensors comprise at least one of a biometric sensor, an audio sensor, or an image sensor.

10. A system comprises:
    one or more processors included as part of a computing device of a user; and
    non-transitory computer readable medium storing instructions that, when executed by the one or more processors, cause the computing device to:
    receive, from an external device of an individual, identification data of the individual associated with the external device;
    identify a camera at a location within a vicinity of the computing device of;
    generate instructions informing the user to travel to the location of the camera;
    output the instructions on a display of the computing device;
    access, from one or more databases, ratings data specific to the individual, the ratings data is based on historical interactions of the individual with one or more other users;
    compare the ratings data with one or more of a plurality of threshold values;
    determine, based on the comparing, whether the ratings data satisfies one or more of the plurality of threshold values; and initiate one or more of a plurality of action sets responsive to the ratings data satisfying the one or more of the plurality of threshold values.

11. The system of claim 10, wherein the non-transitory computer readable medium storing instructions that, when executed by the one or more processors, further cause the computing device to:
- activate, responsive to receiving the data identifying the individual, a software application operating on the computing device of the user; and
- output, on a display of the computing device, the data identifying the individual associated with the external device using the software application.

12. The system of claim 10, wherein the non-transitory computer readable medium storing instructions that, when executed by the one or more processors, further cause the computing device to:
- activate, responsive to an input from the user, an audio recording component that is included as part of the computing device of the user; and
- activate, responsive to an additional input from the user, an image capturing component that is included as part of the computing device of the user.

13. The system of claim 10, wherein the non-transitory computer readable medium storing instructions that, when executed by the one or more processors, causes the computing device to initiate the one or more of the plurality of action sets responsive to the ratings data satisfying the one or more of the plurality of threshold values by transmitting, responsive to an input from the user, text messages to target devices that are external to and independent of the computing device.

14. The system of claim 10, wherein the non-transitory computer readable medium storing instructions that, when executed by the one or more processors, causes the computing device to initiate the one or more of the plurality of action sets responsive to the ratings data satisfying the one or more of the plurality of threshold values by:
- automatically activating an audio recording device that is included as part of the computing device of the user;
- automatically activating an image capturing device that is included as part of the computing device of the user; and
- automatically transmitting text messages to target devices that are external to and independent of the computing device.

15. The system of claim 10, wherein the non-transitory computer readable medium storing instructions that, when executed by the one or more processors, further cause the computing device to:
- activate, responsive to receiving the data identifying the individual, a software application operating on the computing device of the user; and
- receive in real time, from the external device, a request for a video conference with the user.

16. The system of claim 15, wherein the non-transitory computer readable medium storing instructions that, when executed by the one or more processors, further cause the computing device to:
- accept in real time, by the computing device, the request for the video conference based on an input from the user;
- establish, by the computing device using the software application, a secure connection between the computing device and the external device the video conference; and
- perform the video conference via a display of the computing device and an additional display included as part of the external device, the video conference including the user and the individual.

* * * * *